United States Patent [19]

Otto

[11] Patent Number: 4,770,548
[45] Date of Patent: Sep. 13, 1988

[54] HYDRODYNAMIC SEAL

[75] Inventor: Dennis L. Otto, Malvern, Ohio

[73] Assignee: The Timken Company, Canton, Ohio

[21] Appl. No.: 79,175

[22] Filed: Jul. 29, 1987

Related U.S. Application Data

[63] Continuation-in-part of Ser. No. 811,657, Dec. 19, 1985, abandoned.

[51] Int. Cl.[4] .............................. F16C 33/78
[52] U.S. Cl. ................................. 384/478; 384/479; 277/3; 277/29; 277/215; 277/134
[58] Field of Search ............. 384/478, 479, 486, 484, 384/489; 277/134, 3, 29, 215, 152, 153

[56] References Cited

U.S. PATENT DOCUMENTS

| | | |
|---|---|---|
| 3,341,264 | 9/1967 | Otto . |
| 3,455,564 | 7/1969 | Dega ..................... 277/134 |
| 3,497,225 | 2/1970 | Workman ............... 277/134 |
| 3,515,395 | 6/1970 | Weinand ................ 277/134 |
| 3,519,316 | 7/1970 | Gothberg . |
| 3,523,692 | 8/1970 | Otto ....................... 277/25 |
| 3,586,342 | 6/1971 | Staab ..................... 27/134 |
| 3,628,837 | 12/1971 | Otto . |
| 3,709,572 | 1/1973 | Pethis . |
| 3,748,003 | 7/1973 | Barber . |
| 3,790,178 | 2/1974 | Cameron ............... 384/489 |
| 3,807,743 | 4/1974 | Burke ..................... 277/134 |
| 3,895,814 | 7/1975 | Kupfert .................. 277/134 |
| 3,921,987 | 11/1975 | Johnston et al. ....... 277/134 |
| 4,344,631 | 8/1982 | Winn ...................... 277/3 |
| 4,399,998 | 8/1983 | Otto ....................... 277/134 |
| 4,448,461 | 5/1984 | Otto . |
| 4,522,411 | 6/1985 | Burgan .................. 277/134 |

FOREIGN PATENT DOCUMENTS

| | | |
|---|---|---|
| 3234430 | 6/1983 | Fed. Rep. of Germany . |
| 2519103 | 7/1983 | France . |
| 1181045 | 2/1970 | United Kingdom . |
| 2112879 | 7/1983 | United Kingdom . |

OTHER PUBLICATIONS

Asle Preprint #73AM-9B-1, "Birotational Seal Designs", 4-30-73.
ASME Publicattion "Zero Leakage" (no date).

Primary Examiner—Lenard A. Footland
Attorney, Agent, or Firm—Gravely, Lieder & Woodruff

[57] ABSTRACT

A hydrodynamic seal suitable for closing the end of a tapered roller bearing includes a seal case which is pressed into a counterbore at the end of the bearing cup and an elastomeric sealing element having a primary lip and secondary lip which cooperate with a sealing surface on the thrust rib of the bearing cone to effect a live seal along that surface. The primary lip is spaced from the sealing surface of the cone thrust rib and has pumping cavities which open both toward the sealing surface and toward the interior of the bearing. Moreover, they are configured to pump lubricant that enters them back toward the interior of the bearing. An annular space exists between the primary and secondary lips and the pumping cavities also open into this space at small vent apertures, so that any increase in pressure within the interior of the bearing is transmitted through the pumping cavitis to the annular space. The secondary lip actually contacts the sealing surface of the thrust rib, but is oriented oblique to that surface, so that a pressure increase transmitted to the annular cavity causes the secondary lip to lift slightly away from the sealing surface and relieve the increase in pressure.

25 Claims, 3 Drawing Sheets 4,770,548

HYDRODYNAMIC SEAL

RELATED APPLICATION

This application is a continuation-in-part of application Ser. No. 811,657 of Dennis L. Otto, filed Dec. 19, 1985, now abandoned, and entitled HYDRODYNAMIC BEARING SEAL.

BACKGROUND OF THE INVENTION

This invention relates to seals, and more particularly to seals that are capable of pumping or impelling a lubricant back to the regions isolated by such seals and to such seals combined with a machine structure sealed thereby.

Front wheel drive automobiles have little space to spare in the regions of their front wheels, and as a consequence automobile manufacturers utilize highly compact bearings for the front wheels of their vehicles. Some manufacturers have turned to angular contact ball bearings by reason of the compact configurations which are available with such bearings, but these bearings do not have the load-carrying capacity nor the durability of tapered roller bearings, which are generally somewhat larger, particularly in the axial dimension. Indeed, double row tapered roller bearings have experienced wide spread use in front wheel drive automobiles. As with any bearing designed for road wheels, the double row tapered roller bearing requires a seal at each of its ends, and to keep the bearing as compact as possible, the seals are often fitted directly into ends of the cup or outer race such that they encircle and indeed contact the cone or inner race.

The typical front wheel bearing operates over a wide range of temperatures, and this variance is accompanied by a corresponding variance in pressure within the sealed interior of the bearing. With some seals, the live seal formed by it becomes more effective with the increase in temperature, but this is not necessarily desirable, because it may damage the seal, or in extreme cases may cause the seal to actually be dislodged from the cup in which it is normally retained. Thus, the sealed cavity should be vented, and various arrangements have been developed for achieving this end.

SUMMARY OF THE INVENTION

One of the principal objects of the present invention is to provide a seal which is highly compact, yet very effective and efficient. Another object is to provide a seal of the type stated which vents the sealed region, with the venting occurring along the surface at which the actual live seal is established. A further object is to provide a seal of the type stated which in operation pumps or impels the lubricant toward the region isolated by the seal, with the pumping or impelling action becoming more effective as the relative velocity between the machine components increases. An additional object is to provide a seal of the type stated which is ideally suited for double row tapered roller bearings of the type used for front wheel drive automobiles. Still another object is to provide a tapered roller bearing assembly containing a seal of the type stated. These and other objects and advantages will become apparent hereinafter.

DESCRIPTION OF THE DRAWINGS

In the accompanying drawings which form part of the specification and wherein like numerals and letters refer to like parts wherever they occur

DETAILED DESCRIPTION

Figure 1:
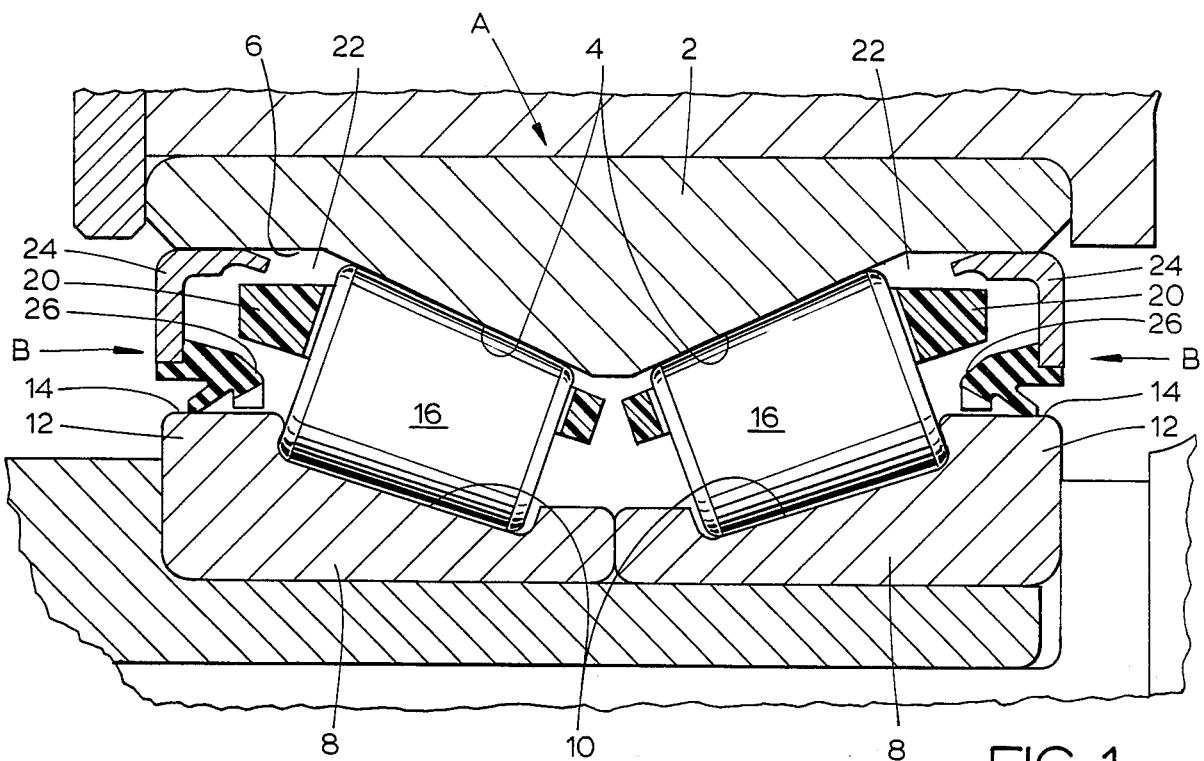
FIG. 1 is a partial sectional view of a bearing containing seals constructed in accordance with and embodying the present invention.

Referring now to the drawings, a double row tapered roller bearing A (FIG. 1) is at each of its ends closed by a seal B which actually fits into and forms a part of the bearing A. The seals B further serve to unitize the bearing A in the sense that they hold the components of the bearing A together, thus enabling the bearing A to be handled without falling apart. The bearing A is highly compact, yet possesses the large load-carrying capacity and the durability which are characteristic of tapered roller bearings. As such, the bearing A is suited for use at the front wheel locations of front wheel drive automobiles.

The bearing A includes (FIG. 1) a double cup 2 having a pair of inwardly presented raceways 4 and at the large diameter ends of those raceways 4, cylindrical counterbores 6 which run out to the ends of the cup 2. It is across these ends that the cup 2 is clamped in a supporting structure such as the steering knuckle of an automotive suspension system. The cup 2 surrounds a pair of cones 8 which abut midway between the ends of the cup 2, which is where the cup raceways 4 are smallest, and each cone 8 has a tapered raceway 10 which faces and indeed is encircled by one of the cup raceways 4. Each cone raceway 10 leads out to a thrust rib 12 having a cylindrical sealing surface 14 of greater diameter, and that surface in turn leads out to that end of the cone 8 known as the cone back face. The thrust rib 12 forms an integral part of the cone 8, and its sealing surface 14 lies within the counterbore 6 at the corresponding end of the cup 2. The two cones 8 are clamped together in another structure which may be a hub that is within the steering knuckle of a front wheel drive automobile.

In addition to the double cup 2 and the two cones 8, the bearing A has tapered rollers 16 (FIG. 1) which are arranged in two rows corresponding to the sets of opposed raceways 4 and 10 on the cup 2 and cones 8. Thus, a separate row of rollers 16 surrounds each cone 8. Along their large end faces the rollers 16 abut against the thrust rib 12 for their respective cones 8, so that the thrust ribs 12 prevent the rollers 16 from being expelled from the spaces between the raceways 4 and 10 when the bearing is subjected to radial loads. Each row of rollers 16 contains a cage 18 which maintains the proper spacing between adjacent rollers 16, and further holds the rollers 16 around its cone 8 when the one 8 is removed from the cup 2. Each cage 18 has a large end ring 20 which extends across the large end faces of the rollers 16 and in so doing projects into the counterbore 6 at the corresponding end of the cup 2, or more accurately into the annular space between the surface of the counterbore 6 and the cylindrical sealing surface 14 on the thrust rib 12 of the cone 8. The tapered rollers 16 of the rows and the cages 18 for those rollers 16 move within a sealed or isolated annular cavity 22 which is closed at its ends by the seals B.

The cup 2 and cones 8 are concentric about the axis x of rotation for the bearing A, and in the operation of a typical front wheel drive bearing, the cup 2 is stationary while the cones 8 revolve within the cup 2. In so doing the tapered rollers 16 in the two rows move along the raceways 4 and 10, and to reduce friction, particularly between the large end faces of the rollers 16 and the thrust rib 12 of the two cones 8, a supply of lubricant exists within the bearing Indeed, the tapered rollers 16 tend to pump the lubricant to the thrust rib 12. The seals B occupy the annular spaces between the surfaces of the cup counterbores 6 and the sealing surfaces 14 of cone thrust ribs 12 and prevent the lubricant from escaping, with the actual live seal being established along the sealing surfaces 14 of the cone thrust ribs 12. The seals B further exclude dust, water and other contaminants from the interior of the bearing A. Thus, the seals B serve to isolate the annular cavity 22 (FIG. 1) that exists between the cup 2, on one hand, and the two cones 8, on the other. Since the cavity 22 contains the tapered rollers 16, it experiences wide variations in temperature, but these variations do not significantly affect the pressure within the cavity 22, because the seals B vent the cavity 22.

Figure 2:
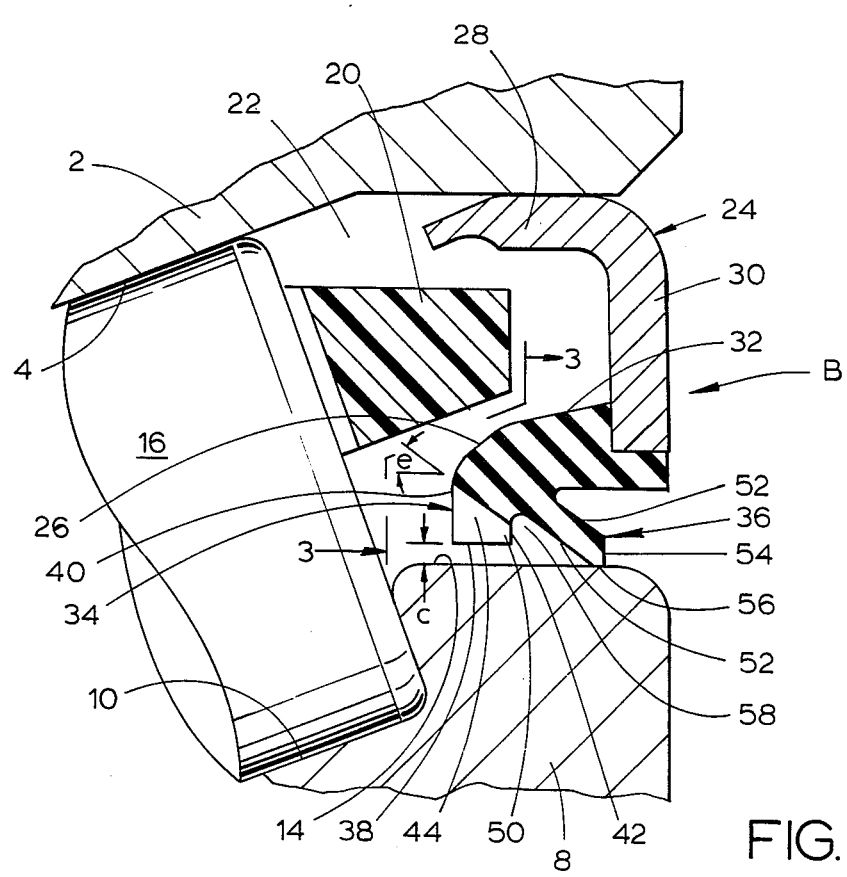
FIG. 2 is an enlarged sectional view of the seal that forms the present invention as well as the surrounding regions of the bearing.

Each seal B includes (FIG. 2) a metal seal case 24 and an elastomeric sealing element 26 which is bonded to the seal case 26. The case 24, which serves as a mount for the elastomeric sealing element 26, has an axial portion 28 which is cylindrical and fits into the cup counterbore 6 at one end of the bearing A, there being an interference fit between the cylindrical surface of the bore 6 and the axial portion 28, so that the seal B remains firmly in place within the cup 2. The interference fit further establishes a static seal along the surface of the counterbore 6. In addition, the seal case 24 has a radial portion 30 which is formed integral with the axial portion 28 and projects radially inwardly from the axial portion 28. When the seal B is installed properly within the cup 2, the outwardly presented face of the radial portion 30, that is the face which is presented away from the sealed cavity 22, is flush with respect to the end or back face of the cone 8 and is offset slightly inwardly from the end of the cup 2. Indeed, the radial portion 30 projects toward the sealing surface 14 on the thrust rib 12, but its inner edge is somewhat greater in diameter than the sealing surface 14 so that an annular gap exists between the two. The elastomeric sealing element 26 closes this gap.

The elastomeric sealing element 26 is bonded to the seal case 24 along the inner edge of the radial portion 30 and also along that face of the radial portion 30 which is presented toward the sealed cavity 22, but as to the latter, it is only for a small annular area that is adjacent to the inner edge of the radial portion 30. From its point of attachment the sealing element 26 projects generally toward the sealed cavity 22 and inwardly toward the sealing surface 14 to effect a live or dynamic seal with respect to the sealing surface 14. In so doing it provides within the sealed cavity 22 an annular space into which the large end ring 20 at the end of the cage 18 projects, and this ring of course revolves in the space when the cone 8 turns within the cup 2 or vice-versa.

More specifically, the sealing element 26 includes (FIG. 2) an elongated body 32 which is bonded to the radial portion 30 of the seal case 24 and projects generally axially therefrom toward the sealed cavity 22, yet is spaced outwardly from the wear surface 14 on the cone thrust rib 12. At its attached end the body 32 lies flush with the outside face of the radial portion 30 for the seal case 24. At its opposite end, the body 32 merges into two seal lips - a primary lip 34 and a secondary lip 36. The primary lip 34 exists on the lubricant side of the seal B, that is on the side which is presented toward the sealed cavity 22, and its primary purpose is to keep the lubricant within the sealed cavity 22. The secondary lip 36 exists at the air side of the seal B and as such is at the exterior of the bearing B. Its primary purpose is to prevent dust, water and other contaminants from entering the sealed cavity 22. Both lips 34 and 36 encircle and cooperate with the sealing surface 14 on the cone thrust rib to serve their respective functions.

Figure 3:
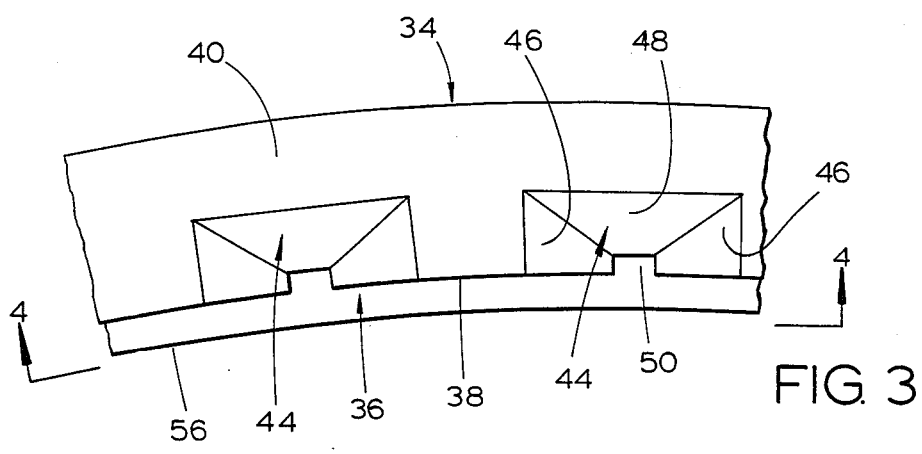
FIG. 3 is a partial end view of the seal taken along line 3—3 of FIG. 2.
Figure 4:
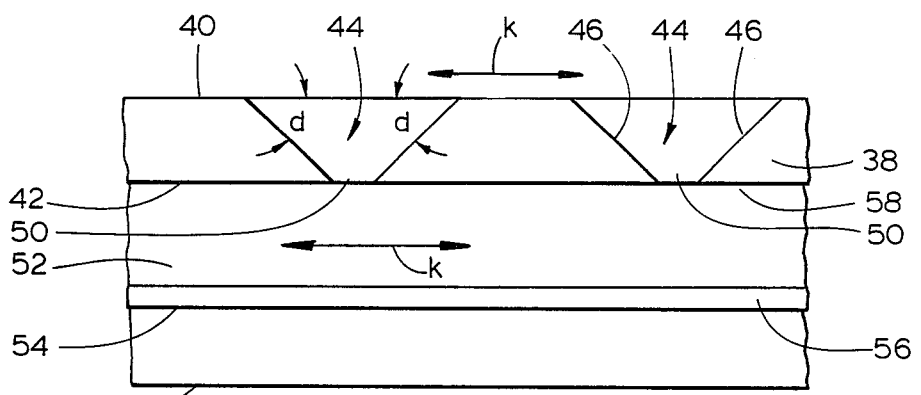
FIG. 4 is a view taken along line 4—4 of FIG. 3 and showing the undersides of the two seal lips, that is the faces of those lips which are presented toward the sealing surface of the bearing cone.

Considering the primary lip 34 first, it turns radially inwardly from the body 32 and terminates at a circumferential or cylindrical face 38 (FIGS. 2-4) which is presented toward, but is slightly greater in diameter than, the cylindrical sealing surface 14 on the cone thrust rib 12. As a consequence, a slight clearance c exists between the wear surface 14 and the face 38, and this clearance typically could range between 0.002 and 0.044 inches, this being a working clearance since eccentricity between the primary lip 34 and sealing surface 14 as the result of manufacturing tolerances generally has already been taken into consideration. On one side of the cylindrical surface 38 is an inner end face 40 which is presented toward the sealed cavity 22 and on the other side an outer end face 42 which is presented toward the secondary lip 36. Both faces are radial, that is they lie in planes which are perpendicular to the bearing axis x, and hence they are parallel to each other. Neither the cylindrical face 38 nor the inner end face 40 is continuous, but instead they are interrupted by small pockets or cavities 44 which are configured to pump or impell any lubricant that enters them back toward the tapered rollers 16, that is back into the sealed cavity 22. The cavities 44 are arranged at equal circumferential intervals along the primary lip 34, with each cavity 44 opening out of both the cylindrical face 38 and the inner end face 40 of the primary lip 34. To effect the pumping or impelling action, each cavity 44 has a pair of side faces 46 (FIGS. 3 & 4) which are located at equal angles d with respect to the direction of relative rotation k between the lip 34, and sealing surface 14, that is with respect to a plane that lies perpendicular to the axis x. The angle d should be between 30° and 60° and should preferably be 45°. Thus, the side faces 46 intersect the cylindrical face 38 along lines which are oblique to the direction of relative rotation k between the primary lip 34 and sealing surface 14, which is, of course, the circumferential direction. Completeing the cavity 44 is a connecting face 48 which extends between the two side faces 46 and is oriented at an angle e (FIG. 2) with respect to the cylindrical sealing surface 14, it being farthest from the cylindrical surface 14 at the inner end face 40. The two side faces 46 are planar, while the outside face 48 may be planar or perhaps slightly concave. All three of the faces 46 and 48 intersect the outer end face 42, with the lines of intersection for the side faces 46 being spaced slightly apart and the intersection for the connecting face 48 being outwardly from the cylindrical face 38 (FIG. 3). The result is a small vent aperture 50 that opens out of the outer end face 42 toward the secondary lip 36, that aperture of course being at the small end of the pumping cavity 44. When the cone 8 rotates, lubricant that is between the sealing surface 14 of the cone thrust rib 12 and the cylindrical face 38 of the primary lip 34 migrates into the pumping cavities 44 where it is deflected axially by the side faces 46. Actually, the rotation of the cone 8 not only causes the lubricant to flow into each cavity 44, but further causes it to come against one side face of each cavity 44, and that side face, being at the angle d with respect to the direction of relative rotation k, which is of course the circumferential direction, deflects the lubricant back toward the sealed cavity 22 and the tapered rollers 16 within it. The outside face 48, inasmuch as it is oblique to the axis x, also deflects lubricant back toward the sealed cavity 22 and allows lubricant, when subjected to the centrifugal forces generated by relative rotation between the cup 2 and cone 8, to flow outwardly away from the axis x of rotation as the lubricant moves into the sealed cavity 22. By reason of their wedge-shaped configurations, the pumping cavities 44 will deflect the lubricant in the same axial direction, irrespective of the direction that the cone 8 rotates, and also irrespective of whether the cone 8 or cup 2 is the rotating race of the bearing A. In this regard, in one direction of rotation one side face 46 and the outside face 48 of each cavity 44 will deflect the lubricant back toward the sealed cavity 22 that represents the interior of the bearing A, and in the other direction of rotation, the other side face 46 and connecting face 48 will likewise deflect the lubricant, again axially back toward the sealed cavity 22. The vent apertures 50 at the ends of the cavities 44 prevent the sealed cavity 22 from experiencing an increase in pressure.

The secondary lip 36 (FIG. 2) projects from the body 32 generally away from the primary lip 34 and toward the exterior of the bearing A, it having parallel side faces 52, a short end face 54 and a contact face 56. The inside of the two side faces 52 merges into the outer end face 42 of the primary lip 34 at a fillet, and as a consequence a narrow annular space 58 exists between the two lips 34 and 36. When the secondary lip 36 is undistorted, its contact face 56 has a diameter somewhat less than that of the cylindrical face 38 and also less than that of the sealing surface 14 on the thrust rib 14, so that when the seal B is on the bearing A, the secondary lip 36 is deflected slightly toward the exterior of the bearing A, with its contact face 56 bearing against the sealing surface 14 for the full circumference of the surface 14. Thus, in contrast to the primary lip 34, some friction develops between the secondary lip 36 and the wear surface 14, but that friction is small due to the small area of contact and the seepage of a small amount of lubricant through the vent apertures 50 and into the region of contact at the contact face 56.

The bearing A is furnished as a unit ready to install in an automobile steering knuckle or some other appliance, that is, with its own supply of lubricant in the sealed cavity 22 and the seals B in place at the ends of the cup 2. Indeed, the seals B serve to unitize the bearing A for handling purposes, in that they prevent the rollers 16 and cones 8 from coming axially out of the ends of the cup 2.

When the bearing B is placed in operation, as for example at the drive wheel for a front wheel drive automobile, the cones 8 will rotate relative to the cup 2 or vice-versa. As a consequence, the tapered rollers 14 tend to pump some of the lubricant toward the thrust ribs 12 of the two cones 8 and over the sealing surfaces 14 of those ribs 12. This lubricant, upon encountering the primary lip 34 of each seal B is for the most part returned toward the tapered rollers 16 and the sealed cavity 22 in which they revolve. In particular, upon migrating along the sealing surface on the thrust rib 12 for either cone 8, the lubricant becomes caught in the pumping cavities 44 of the primary lip 34 for the seal B at that end of the bearing A, and here the side faces 46 and connecting faces 48 of the cavities 44, those faces being oblique to the direction of relative rotation between the wear surface 14 and primary lip 36, drive the lubricant axially and radially back toward the sealed cavity 22. When the cones 8 constitute the rotating races of the bearing B, the centrifugal force developed tends to fling the lubricant out into the pumping cavities 44, but even when the cup 2 is the rotating component the surface tension between the cylindrical face 38 of the primary lip 34 and the lubricant is enough to cause the lubricant to be caught up on the pumping cavities 44 and to be deflected or impelled axially and radially by the faces 46 and 48 of them.

Should the pressure within the sealed cavity 22 increase, this increase in pressure will be transmitted through the vent apertures 50 into the annular space 58 between the two seal lips 34 and 36, and if great enough will lift the secondary lip 36 slightly to release the pressure. Thus, the pressure within the sealed cavity 22 never becomes great enough to damage the seal B or to dislodge it.

A very small quantity of lubricant works its way under the cylindrical face 38 of the primary lip 34, or perhaps through the vent apertures 50 in that lip, and passes on to the contact face 56 of the secondary lip 34 to reduce the friction between that face and the wear surface 14 of the thrust rib 12. The secondary lip 36 serves primarily to exclude dust, moisture, and other contaminants from the sealed cavity 22, so that raceways 4 and 10 and the rollers 16 in that cavity are not damaged by such contaminants. In addition the secondary lip 36 creates a back pressure when lubricant migrates into the area under the cylindrical face 38 of the primary lip 34. This back pressure minimizes the amount of lubricant that can enter this area and forces some of the lubricant into engagement with the pumping cavities 44 resulting in return of the lubricant to the sealed cavity 22. During starts and stops in operation or when the speed of rotation is so slow that the pumping cavities 44 are ineffective in returning lubricant to sealed cavity 22, the area adjacent to secondary lip 36 is partially filled with lubricant which will provide lubrication to lip 36 when the speed of rotation increases.

Figure 5:
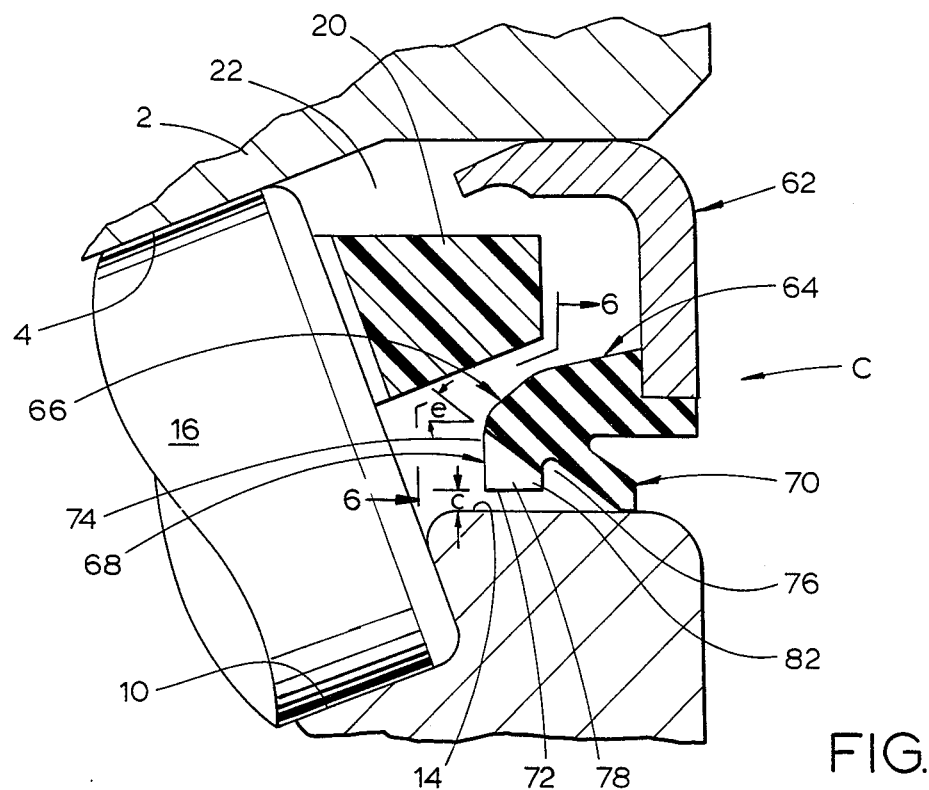
FIG. 5 is an enlarged sectional view of a modified seal which also forms part of the present invention.
Figure 6:
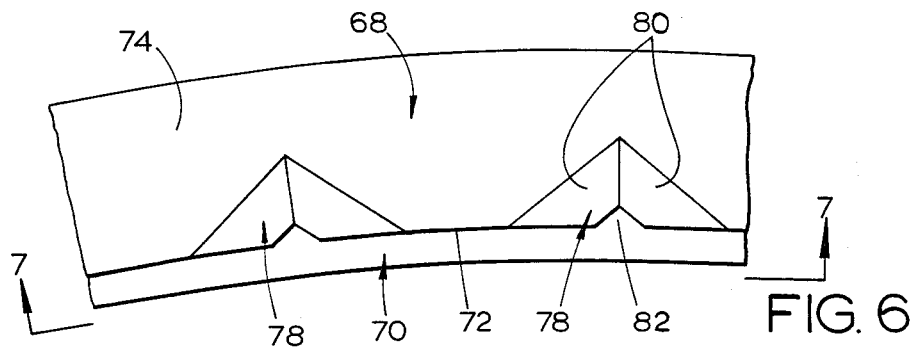
FIG. 6 is an end elevational view of the modified seal taken along line 6—6 of FIG. 5.
Figure 7:
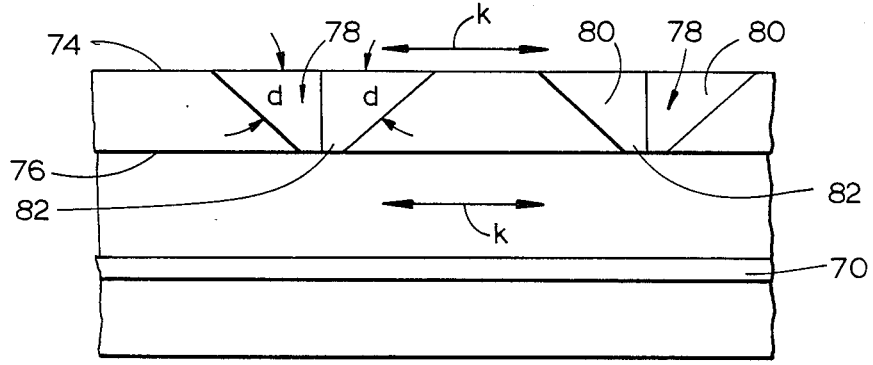
FIG. 7 is a view of the modified seal taken along line 7—7 of FIG. 6 and showing the undersides of the seal lips.

A modified seal C (FIGS. 5–7) also has a case 62 and an elastomeric sealing element 64 having a body 66, a primary lip 68 and a secondary lip 70, all of which are quite similar to their counterparts in the seal B.

However, the pumping cavities in the primary lip 68 for the seal C, where they open toward the sealed cavity 22, are triangular instead of rectangular. More specifically, the primary lip 68 has (FIG. 5) an outer cylindrical face 72 which is presented toward the sealing surface 14, but is slightly larger in diameter so that a clearance c of about 0.002 to 0.044 inches exists between the two. The cylindrical face 72 extends between an inner end face 74 and an outer end face 76 which are parallel and extend generally radially, that is, they lie in planes perpendicular to the bearing axis x. The primary lip 68 contains pumping cavities 78 which essentially open out of the cylindrical face 72 and the inner end face 74. Each pumping cavity 78 has (FIGS. 6 & 7) two side faces 80 which intersect and are oblique to both the cylindrical face 72 and the inner end face 74. Moreover, the side faces 80 intersect the cylindrical faces 72 along lines that are located at equal angles d (FIG. 7) with respect to the direction of relative rotation k, that is the circumferential direction. The angle d should be between about 30° and 60°. While the side faces 80 of the pumping cavities 78 converge toward the outer end face 76, they still intersect that face, forming in it small vent apertures 82 (FIG. 6) of triangular shape.

The seal C, when installed in the bearing A, operates much like the seal B, except that the pumping is effected by the side faces 80.

In the seal B, the pumping cavities 44 may be located entirely inwardly from the outer end face 42 to eliminate the vent apertures 50, and likewise in the seal C the pumping cavities 78 may terminate short of the outer end face 76, thus eliminating the vent apertures 82. The seals B and C will function effectively without their respective vent apertures 50 and 82, but of course, the sealed cavity 22 of the bearing B is not as effectively vented and may experience more than a minimal rise in pressure and could experience some additicnal loss of lubricant.

It is possible that tolerances in the manufacture of the bearing A and either of the seals B or C or dimensional changes in seals B or C due to time and temperature relationships in service, may cause a portion of the cylindrical faces 38, or the primary lip 34 of the seal B or a portion of the cylindrical face 72 on the primary lip 68 of the seal C to inadvertently contact the sealing surface 14 of the cone thrust 12 which it surrounds, but nevertheless the cylindrical faces 38 or 72 are for the most part spaced from the wear surfaces 14 that they encircle.

In lieu of molding the sealing element 26 or 64 of the seal B and C from an elastomer, it may be molded from a somewhat flexible polymer. Also, the primary lip 34 or 68 may be formed from metal, perhaps integral with the case 24 or 62, in which case the secondary lip 36 or 70 would be bonded to it, and that secondary lip could be either an elastomer or a polymer.

The circumferential face 38 or 72 of either seal B or C may merge directly into the secondary lip 36 or 70, that is the circumferential face 38 or 72 may extend out to the nearby secondary lip 36 or 70 in the absence of an inner end face 42 or 74.

Of course, either seal A or B may be used to close an annular space between a shaft and a surrounding structure and is not limited exclusively to use at the ends of tapered roller bearings.

This invention is intended to cover all changes and modifications of the example of the invention herein chosen for purposes of the disclosure which do not constitute departures from the spirit and scope of the invention.

What is claimed is:

1. In combination with a pair of machine components which are arranged such that one will rotate relative to the other about an axis of rotation, one component being hollow and the other component being received in the hollow component and having a sealing surface that is concentric to and presented away from the axis of rotation, an improved seal for isolating within the hollow component a region that contains a lubricant, said seal comprising: a mount attached to the hollow component such that a static seal exists between the mount and the hollow component; a primary seal lip carried by the mount and having spaced apart inner and outer end faces, each located at an angle with respect to the sealing surface, and a circumferential face that extends between the end faces and is presented toward the sealing surface, the inner end face being presented toward and exposed to the region isolated by the seal and the outer end face being presented away from the region isolated by the seal, the circumferential face being concentric to and substantially parallel to the sealing surface, but being spaced outwardly from the sealing surface so that a clearance exists between the circumferential face and the sealing surface, the primary lip further having a plurality of pumping cavities arranged at intervals circumferentially along it, with each pumping cavity opening out of both the inner end face and the circumferential face, each pumping cavity being defined by faces including side faces which diverge toward the inner end face and are located at an angle with respect to the direction of relative rotation so that lubricant which enters the cavity will be deflected axially toward the region isolated by the seal irrespective of the direction of relative rotation, the faces of each pumping cavity further being arranged to impart a generally wedge shaped cross-sectional configuration to the cavity with at least one of the faces diverging from the axis of rotation toward the inner end face, whereby lubricant which enters the cavity will also be directed generally away from the axis of rotation under the influence of centrifugal force; and a secondary lip also carried by the mount and being axially offset from the primary lip so that an annular space exists between the two lips, the secondary lip contacting the sealing surface along the full circumference of the sealing surface and being oriented with respect to the sealing surface such that an increase in pressure within the annular space will cause the secondary lip to separate slightly from the sealing surface and vent the annular space.

2. The combination according to claim 1 wherein the sealing surface and the circumferential face of the primary lip are cylindrical and the inner and outer end faces are generally perpendicular to the cylindrical sealing surface and the circumferential face.

3. The combination according to claim 1 wherein each cavity also opens out of the outer end face of the primary lip at a small vent aperture in that outer face.

4. The combination according to claim 1 wherein the clearance between the circumferential face of the primary lip and the sealing surface is at least about 0.002 inches.

5. In combination with a sealing surface of circular cross-sectional configuration and a component located generally around the surface and arranged such that relative rotation about an axis of rotation may occur between the sealing surface and the component, an improved seal for isolating within the component a region that contains a lubricant, said seal comprising: a generally rigid case attached to the component such that a static seal exists between the component and the case and a sealing element attached to the case and encircling the sealing surface, the sealing element including a primary lip presented toward the isolated region and a secondary lip presented away from the isolated region, the primary lip having a circumferential face which is presented toward and encircles the sealing surface, but is spaced from the sealing surface, and a first end face which is presented at a substantial angle with respect to the circumferential face and is presented toward and exposed to the isolated region, the circumferential face and the first end face merging at an edge, the primary lip further having pumping cavities which open out of the circumferential and first end faces through the edge at which those faces merge so that the edge is interrupted by the cavities, each cavity having side faces which diverge toward the first end face and are oblique to the direction of relative rotation between the sealing surface and the component which is generally around the sealing surface, so that a lubricant entering the cavity will be pumped back toward the isolated region irrespective of the direction of relative rotation, the secondary lip contacting the sealing surface for the full circumference of the sealing surface.

6. The combination according to claim 5 wherein the primary lip has a second end face which is faced from the first end face and is presented toward the secondary lip, the second end face likewise being presented at a substantial angle with respect to the circumferential face and merging with the circumferential face at another edge, whereby the circumferential face is located between the two edges.

7. The combination according to claim 6 wherein the pumping cavities also open out of the second face in the form of vent apertures.

8. The combination according to claim 5 wherein each cavity is generally wedge-shaped in a plane that passes through the cavity and contains the axis of relative rotation, with the cavity being larger at first end face than remote from the first end face, so that lubricant which enters the cavity is also directed outwardly away from the axis of rotation.

9. The combination according to claim 5 wherein each cavity has at least one face which is directed outwardly away from the axis of rotation such that the cavity is larger at the first end face than remote from the first end face, whereby lubricant which enters the cavity is also directed outwardly away from the axis of rotation.

10. The combination according to claim 5 wherein the secondary lip is oblique to the sealing surface and is directed generally away from the primary lip so that an increase in pressure within the isolated region will cause the secondary lip to separate slightly from the sealing srrface and vent the isolated region.

11. The combination according to claim 5 wherein the circumferential face of the primary lip generally follows the contour of that portion of the sealing surface which it surrounds, both axially and circumferentially.

12. In combination with a sealing surface of circular cross-sectional configuration and a component located generally around the surface and arranged such that relative rotation about an axis of rotation may occur between the sealing surface and the component, an improved seal for isolating within the component a region that contains a lubricant, said seal comprising: a generally rigid case attached to the component and an elastomeric sealing element attached to the case and including a primary lip presented toward the isolated region and a secondary lip presented away from the isolated region, the primary lip having a first face which is presented toward and encircles the sealing surface, generally following the contour thereof both axially and circumferentiall, but is spaced from the sealing surface, and a second face which is located at an angle with respect to the first face and is presented toward and exposed to the isolated region, the primary lip further having pumping cavities which open out of both the first and second faces and are defined by cavity faces some of which are oblique to the direction of relative rotation between the sealing surface and encircling component and at least one of which is oblique to the axis of rotation such that the portion of the cavity located at the second face extends further outwardly from the axis of rotation and is wider than the portion that is remote from the second face, whereby lubricant upon entering any cavity will be pumped back toward the isolated region and directed generally outwardly away from the axis of rotation as a result of the relative rotation, the secondary lip contacting the sealing surface for the full circumference of the sealing surface and being oriented generally obliquely with respect to the sealing surface such that an increase in pressure within the isolated region will cause the secondary lip to separate from the sealing surface and vent the isolated region.

13. The combination according to claim 12 wherein an annular space exists between the primary lip and the secondary lip.

14. The combination according to claim 13 wherein the primary lip has a third face which is spaced from the second face and is located at an angle with respect to the first face, all such that the first face extends between the second and third faces and further is presented toward and along the annular space that separates the primary and secondary lips.

15. The combination according to claim 14 wherein the second and third faces are parallel and the first face is cylindrical.

16. The combination according to claim 12 wherein the faces defining each pumping cavity include a pair of side faces which diverge toward the second face and are oriented at equal but opposite angles with respect to the second face.

17. The combination according to claim 16 wherein the primary lip also has a third face which is spaced from the second face, and the pumping cavities also open out of the third face at small vent apertures.

18. The combination according to claim 17 wherein the side faces of each pumping cavity are also oblique to the first face and further intersect 19. The combination according to claim 12 wherein the first face of the primary lap is for the most part spaced from the sealing surface so that a clearance exists between the first face and the sealing surface, with the mean clearance being between about 0.002 and 0.044 inches.

20. In combination with a tapered roller bearing including a cup having an inwardly presented tapered raceway and a counterbore located as the large end of the raceway, a cone having an outwardly presented raceway that is presented toward and surrounded by the raceway of the cup and a thrust rib located at and projecting radially beyond the large end of the cone raceway, the thrust rib having a sealing surface that is located generally within the counterbore of the cup, tapered rollers located in the space between and contacting the raceways of the cup and con to enable relative rotation between the cupand cone to occur about an axis of rotation, and a lubricant in the space between the cup and cone, a improved seal for isolating the space between the cup and cone and for retaining the lubricant in that space, said seal comprising: a relatively rigid case fitted tightly into the counterbore of the cup so as to be fixed in position with repsect to the cup, and a sealing element attached to the seal case and having primary and secondary lips, the primary lip being located closest to the space isolated by the seal and including a first face presented toward and e circling the sealing surface of the thrust rib such that it generally follows the contour of the sealing surface both axially and circumferentially, but being for the most part spaced from the sealing surface so that a clearance exists between tne first face and the sealing surface, the primary lip also having pumping cavities which open out of the first face toward the sealing surface and also open toward the tapered rollers, the pumping cavities intersecting the first face along lines that are oblique to a plane that is perpendicular to the axis of rotation, with the lines being oriented such that the pupping cavities by reason of relative rotation between the cup and cone deflect lubricant that enters the cavities back toward the tapered rollers irrespective of the direction of relative rotation between the cup and cone, each pumping cavity also being generally wedge-shaped in a plane that intersects it and contains the axis of rotation such that the pumping cavity extends farthest away from the axis of rotation where it opens toward the rollers, so that the cavities deflect the lubricant away from the sealing surface under the centrifugal force generated by the rotation; the secondary lip being located further from the tapered rollers than the primary lip and being in contact with the sealing surface for the full circumference of the sealing surface.

21. The combination according to claim 20 wherein each pumping cavitiy is defined at least in part by a pair of side faces which diverge toward the tapered rollers.

22. The combination according to claim 21 wherein an annular space exists between the primary and secondary lips, and the secondary lip is oblique to the sealing surface of the thrust rib, with its orientation being such that an increase in pressure within the annular space between the lips will cause the secondary lip to lift slightly and relieve the pressure.

23. The combination according to claim 22 wherein the sealing surface of the thrust rib is cylindrical.

24. A seal for isolating a region between machine components which rotate relative to each about an axis of rotation; said seal comprising: a generally rigid case, and an elastomeric sealing element bonded to the case and including a primary lip and a secondary lip spaced axially from the primary lip, the primary lip having a circumferential face which is presented toward the axis of rotation and spaced apart inner and outer end faces which are oriented at substantial angles with respect to the circumferential face and merge with the circumferential face along spaced apart edges, the primary lip having pumping cavities which open out of the circumferential and inner end faces througn the edge at which those faces merge so that the cavities interrupt the edge, each cavity being defined by faces which intersect the circumferential face at lines that diverge toward the edge between the circumferential face and inner end face and are oblique to the direction of relative rotation so that lubricant entering the pumping cavity will be deflected generally axially by virtue of relative rotation between the seal and a surface that it encircles irrespective of the direction of relative rotation, each pumping cavity also being defined by at least one face which diverges from the axis of rotation toward the inner end face so that lubricant entering the cavity is also deflected outwardly under the influence of centrifugal force as the lubricant moves axially through the cavity toward the inner end face, the secondary lip being spaced from the inner end face of the primary lip so that an annular space exists between the two lips, the secondary lip projecting inwardly toward the axis of rotation beyond the primary lip, with its least diameter being less than the diameter of the circumferential face for the primary lip.

25. A seal according to claim 24 wherein the secondary lip projects from the body oblique to the axis cf rotation so that an increase in pressure in the annular space between the lips will cause the primary lip to lift away from a contacting sealing surface.

* * * * *